United States Patent [19]

Bott et al.

[11] Patent Number: 4,564,492

[45] Date of Patent: Jan. 14, 1986

[54] POLYACETYLENE PRODUCTION

[75] Inventors: David C. Bott, Woking; Donald White, Sunbury-on-Thames, both of England

[73] Assignee: The British Petroleum Company, p.l.c., London, England

[21] Appl. No.: 591,470

[22] Filed: Mar. 20, 1984

[30] Foreign Application Priority Data

Apr. 8, 1983 [GB] United Kingdom ............... 8309583

[51] Int. Cl.[4] ........................................... B29D 7/02
[52] U.S. Cl. ................................... 264/154; 264/104; 264/212; 264/216; 264/DIG. 47
[58] Field of Search ............... 264/216, 212, 2.1, 311, 264/104, 204, DIG. 47, 154; 526/281, 282, 285

[56] References Cited

U.S. PATENT DOCUMENTS

| | | | |
|---|---|---|---|
| 4,222,903 | 9/1980 | Heeger | 252/518 |
| 4,228,060 | 10/1980 | Pez | 260/30.4 |
| 4,277,588 | 7/1981 | Naarmann | 526/114 |
| 4,408,027 | 10/1983 | Hocker | 526/185 |
| 4,411,826 | 10/1983 | Naarmann | 252/518 |

FOREIGN PATENT DOCUMENTS 55-24026 2/1980 Japan .

OTHER PUBLICATIONS

Edwards et al, "A New Synthesis of Poly(acetylene)" Polymer, 21, Jun. 1980, p. 595.

*Primary Examiner*—Jeffery Thurlow
*Assistant Examiner*—MaryLynn Fertig
*Attorney, Agent, or Firm*—Brooks, Haidt, Haffner & Delahunty

[57] ABSTRACT

This invention relates to a process for producing an oriented, crystalline poly(acetylene) (III) in film or fibrillar form by solvent casting a film from a solution of a polymer of the general formula (V) derived from a precursor monomer (IV), and transforming the pre-cast film of polymer (V) under tension or in a stress field into the poly(acetylene) (III). The transformation is carried out at a temperature between 20° and 200° C. under reduced pressure over a duration of between 1 and 100 hours in an atmosphere inert to the precursor polymer (V) film and to the poly(acetylene) (III). Poly(acetylenes) are conducting polymers and find use in solid state batteries, field effect transistors and the like.

11 Claims, 1 Drawing Figure

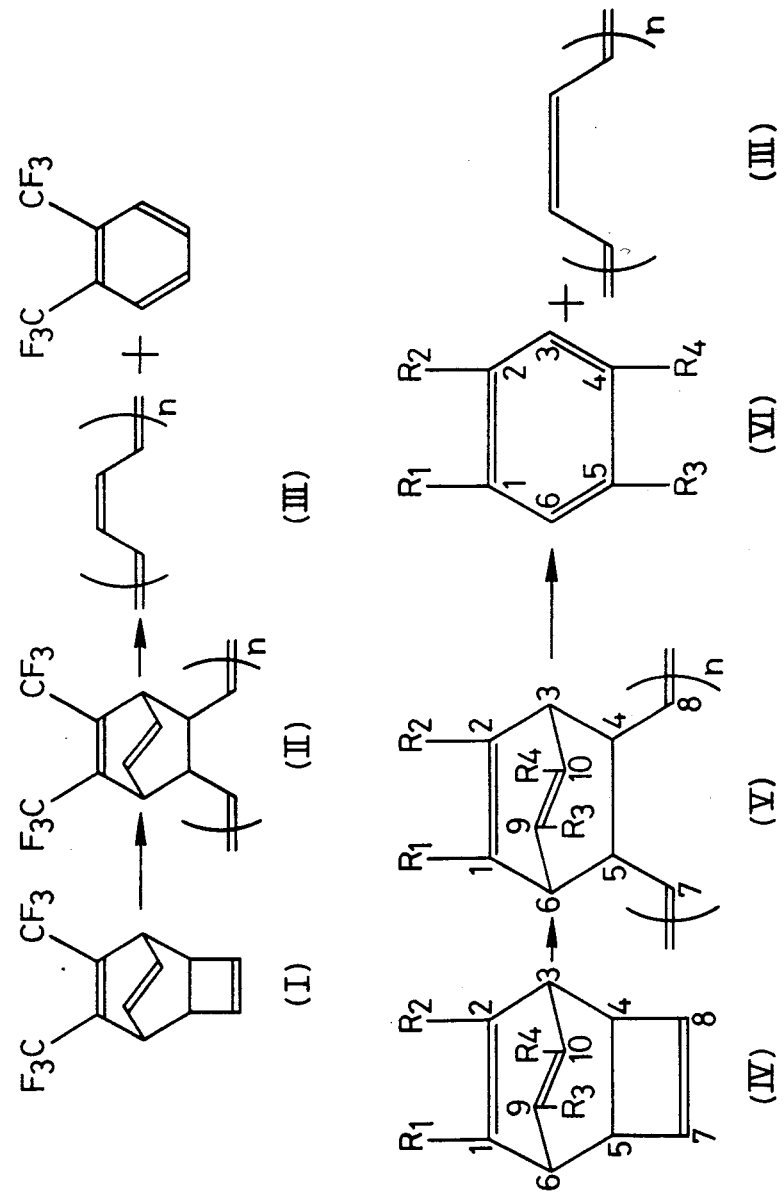

POLYACETYLENE PRODUCTION

The present invention relates to a method of producing oriented, crystalline poly(acetylene) in film or fibrillar form.

Poly(acetylene) is known to have highly desirable electrical conducting properties. Such polymers are usually produced by direct polymerisation of acetylene gas in the presence of a catalyst, eg as described by Ito et al (J. Polymer, Sci. Chem., 12, pp 11, 1974). The polymers thus produced have a relatively low density of around 0.4 g/cc and have a morphology which is an open, irregular, fibrillar structure with random orientation of the fibrils. The conductivity of such polymers has hitherto been improved by appropriate chemical doping. The morphology of polymers produced hitherto offers an advantage with respect to the speed of chemical reactions such as doping. However, due to the high surface area which is an inherent characteristic of such a morphology, the poly(acetylene) is also highly susceptible to oxidative degradation. Moreover, the open and irregular morphology of the polymer and the random orientation of the fibrils makes doping of specific areas of the film with well-defined edges, which is the basis of the semi-conductor industry, virtually impossible. Such polymers are also infusible and insoluble in conventional solvents thereby making it difficult to fabricate isotropic and anisotropic articles therefrom. There is a continuing need in industry for a poly(acetylene) which can be easily and conveniently fabricated into articles of a desired shape, and which can be fabricated to possess a degree of chain alignment. This alignment increases the anisotropy of electrical properties.

More recently, Edwards and Feast (Polymer, vol. 21, June 1980, pp 595) have described a method of producing poly(acetylene) (III) by first polymerising a precursor monomer 7,8-bis(trifluoromethyl)tricyclo[4,2,2,0$^2$ $^5$]-deca3,7,9-triene (I) using a catalyst in toluene and the precursor polymer (II) so formed is spontaneously decomposed to a black product and 1,2-bis(trifluoromethyl)benzene. When the precursor polymer (II) was heated to 150° under a vacuum of 0.01 mm of mercury for 5 hours the authors obtained a product which had an infra-red and Raman spectrum corresponding to that of trans-poly(acetylene) although the elemental analysis showed that only 96.3% of the fluorine had been removed. When heated for a further 3 hours at 210° C., 98.9% of the fluorine had been removed although the polymer would probably have been degraded by this stage. The authors stated that this type of system is too labile for convenient generation of poly(acetylene) and that they were investigating related structures in order to find a more stable precursor.

It has now been found that a poly(acetylene) having a higher density and a markedly different morphology can be produced from the same or similar precursor polymers under appropriate conditions.

The FIGURE is an illustration of the reaction of the process.

Accordingly, the present invention is a process for producing an oriented, crystalline poly(acetylene) (III) in film or fibrillar form comprising solvent casting a film from a solution of a precursor polymer of the general formula (v) derived from a precursor monomer (IV), and transforming under tension or in a stress field the pre-cast film of precursor polymer (V) into an oriented, crystalline film or fibrillar form of the poly(acetylene) (III) and a by-product (VI) at a temperature between 20° and 200° C. under reduced pressure over a duration of between 1 and 100 hours in an atmosphere inert to the precursor polymer (V) film and to the poly(acetylene) (III), wherein in the general formulae IV, V and VI each of the groups $R_1$ and $R_2$ either (a) represent a radical selected from H, $CX_3$, $C_mH_{2m+1}$ and $COOR_5$ wherein X is a halogen atom, m has a value between 1 and 4 and $R_5$ is an alkyl group with 1–4 carbon atoms, or (b) form together with the respective carbon atoms to which they are attached a benzene nucleus, and each of $R_3$ and $R_4$ either (c) represent H atoms, or (d) form together with the respective carbon atoms to which they are attached a benzene nucleus.

Specific examples of the groups $R_1$ and $R_2$ are a trifluoromethyl group, an alkyl group or an alkyl carboxylate group, especially a methyl carboxylate group.

More specifically the precursor monomer (IV) may be a compound in which $R_1$ and $R_2$ are each a trifluoromethyl group, and $R_3$ and $R_4$ are each a hydrogen atom. Such a compound is shown in formula (I) above.

The precursor polymer (V) used in the solvent casting step may be produced by conventional means e.g. that described in the paper by Edwards and Feast referred to above. The polymerisation of the precursor monomer (IV) is suitably carried out in the presence of a tungsten hexachloride/tetralkyl or aryl tin (1:2 w/w) or titanium tetrachloride/trialkyl or dihaloalkyl aluminium (1:2 w/w) catalyst at ambient temperatures and pressures. Depending upon the tendency of the precursor polymer to transform to poly(acetylene), it must be stored at a temperature low enough to slow down this transformation. A specific example of precursor polymer (V) is precursor polymer (II), which is suitably stored at relatively low temperatures suitably below $-10°$ C., preferably below $-20°$ C. and typically $-26°$ C. to prevent the premature transformation thereof into poly(acetylene). At this temperature the precursor polymer of the formula (II) is stable for at least 14 months. Where $R_1$ and $R_2$ represent a benzene ring and $R_3$ and $R_4$ represent hydrogen atoms then the precursor polymer (V) may be conveniently stored at room temperature at which temperature it is stable for at least six months.

For solvent casting a film, the precursor polymer (V) is preferably dissolved in an organic solvent to a concentration which, for a given depth of solution, gives the desired thickness of the required shape. This concentration is typically up to 100 g/l (approximately equivalent to eg a film thickness of up to 100 microns). The precursor polymer (V) is suitably cast from an organic solvent selected from acetone, chloroform, ethyl acetate, tetrahydrofuran, toluene and xylene although solvents such as toluene and xylene are preferred for precursor polymers with aromatic substituents.

The precursor polymer (V) cast into a film facilitates the transformation reaction. The solvent casting process is suitably carried out in the substantial absence of moisture and/or oxygen in the system in order to produce a coherent film having the desirable properties of conductance. It is most preferable to carry out the casting in an atmosphere inert with respect to the precursor polymer (V) and the eventual crystalline polyacetylene in film or fibrillar form. The inert atmosphere is suitably provided by nitrogen or argon gas. The casting temperature may be suitably adjusted to control the rate of deposition of the precursor polymer (V) from the solvent.

After casting, the tension or stress employed, the transformation temperature and the duration for which the precursor polymer (V) is heated to produce the oriented, crystalline poly(acetylene) in film or fibrillar form will depend upon the nature of the substituents in the precursor polymer (V). For example, the precursor polymer film is suitably transformed under a tension or stress in the region of 5 to 1000 MPa, preferably 20 to 400 MPa. The tension or stress under which the solid precursor film is transformed forces the segments of poly(acetylene) to crystallise within the still transforming matrix. Use of higher stress fields may cause tearing of the film and fibrillation. Transmission electron microscopy and X-ray diffraction shows pronounced orientation of the crystals along the stress field. The precursor polymer (V) film is preferably heated at a temperature between 20° and 200° C. for between 1 and 100 hours to produce the poly(acetylene) film. The Table below illustrates the preferred ranges for various substituents in the precursor polymer (V).

TABLE 1

| Substituents | | | | | |
|---|---|---|---|---|---|
| $R_1$ | $R_2$ | $R_3$ | $R_4$ | Temp °C. | Time (hours) |
| H | H | H | H | 20–50 | 1–20 |
| $CF_3$ | $CF_3$ | H | H | 50–120 | 1–100 |
| $CO_2CH_3$ | $CO_2CH_3$ | H | H | 50–120 | 1–100 |
| benzene | ring | H | H | 100–150 | 1–100 |
| benzene | ring | benzene | ring | 175–200 | 1–100 |

For instance, the polymer (II) is heated at a temperature below 150° C., preferably between 50° and 120° C., under vacuum or in the presence of an inert atmosphere, e.g. nitrogen, to transform the precursor polymer (II) into oriented crystalline poly(acetylene) in film or fibrillar form. The heating procedure may be carried out for a period between 1 and 100 hours suitably between 10 and 50 hours to form the crystalline poly(acetylene) polymer. The rate of heating is suitably between 1° and 10° C. per minute. The lower the heating temperature, the longer the duration of heating. The preferred ranges specified relate to that needed to achieve a substantially complete transformation of the precursor polymer (V) film into an oriented crystalline poly(acetylene) in film or fibriller form. For some uses partial transformation may be adequate and hence slight variations outside the preferred ranges may be acceptable.

The conductivity of the pristine poly(acetylene) produced according to the present invention is in the range of between $10^{-8}$ and $10^{-5}$ per ohm per cm.

The electrical properties of the poly(acetylene) produced according to the present invention may be altered as desired by addition of suitable dopants known in the art. Examples of dopants include the halogens, fluorides of arsenic, and protonic acids. The dopants may be added either to the solution from which the precursor polymer (V) film is cast or to the pre-cast polymer by diffusion thereof from a gas or liquid phase, electrochemical diffusion or by ion implantation techniques.

Upon doping, the conductivity of these films and fibres can be substantially improved.

The process for producing oriented, crystalline poly(acetylene) according to the present invention is further illustrated with reference to the following Example.

EXAMPLE 1

A solution of 0.25 g of the precursor polymer (II), prepared from the precursor monomer (I), was dissolved in 50 ml of deoxygenated ethyl acetate was prepared. A drop of this solution was placed on a 3 mm gold transmission microscope grid and the solvent allowed to evaporate for 1 minute at room temperature (25° C.). The grid was then loaded into a temperature controlled stage for the transmission microscope and evacuated to a pressure of approximately $10^{-4}$ torr. An electron diffraction pattern of the sample was produced which showed the film to be largely amorphous. The temperature of the stage was then raised to 80° C. to achieve transformation of the precursor polymer (II) into poly(acetylene) (III), and the sample observed both in bright-field and electron diffraction modes. The electron diffraction patterns showed the development of an orientated crystalline phase of poly(acetylene) which became more ordered with increased time. The stress field which produces this orientation is caused by the sagging of the unsupported thin film between the bars of the grid. The magnitude of the stress field was calculated using SEM micrographs which show the deflection or strain of the film and measurements of the modulus made on untransformed films were carried out in an Instron tensile testing machine. These calculations lead to a value of approximately 100 MPa. Where the stress field was high or where defects existed in the film it tended to tear and the material then fibrillated. The electron diffraction patterns were consistent with the crystal structure of trans-poly(acetylene).

EXAMPLE 2

A solution of 6.8 gms of precursor polymer (II) dissolved in 160 mls of deoxygenated acetone was prepared. A glass tube with internal diameter of 5 mm was filled with this solution. After 12 hours the solution had gelled and could be removed from the glass tube. It was stretched by hanging a weight of 15 gms (8.3 MPa) on one end whilst keeping the other stationary. This weight produced a strain of 550%. As the acetone evaporated the gel collapsed to form a fibre of approximately 150 micron diameter. This fibre was transferred to a heating jacket and maintained at 80° under stress for 5 hours. The final fibre had a diameter of 135 microns. X-ray diffraction experiments on this fibre showed a high degree of orientation and crystallinity. The X-ray diffraction patterns were consistent with the crystal structure of transpoly(acetylene).

We claim:

1. A process for producing an oriented, crystalline poly(acetylene) (III) in film or fibrillar form comprising solvent casting a film from a solution of precursor polymer of the general formula (V) derived from a precursor monomer (IV), and transforming under tension or in a stress field the pre-cast precursor polymer (V) into an oriented, crystalline film or fibrillar form of the poly(acetylene) (III) and a by-product (VI) at a temperature between 20° and 200° C. under reduced pressure over a duration of between 1 and 100 hours in an atmosphere inert to the precursor polymer (V) film and to the poly(acetylene) (III), wherein in the general formulae IV, V and VI each of the groups $R_1$ and $R_2$ either (a) represent a radical selected from H, $CX_3$, $C_mH_{2m+1}$ and $COOR_5$ wherein X is a halogen atom, m has a value between 1 and 4 and $R_5$ is an alkyl group with 1–4 carbon atoms, or (b) form together with the respective carbon atoms to which they are attached a benzene nucleus, and each of $R_3$ and $R_4$ either (c) represent H atoms, or (d) form together with the respective carbon atoms to which they are attached a benzene nucleus.

2. A process for producing poly(acetylene) according to claim 1 wherein the groups $R_1$ and $R_2$ are a trifluoromethyl group, an alkyl group or an alkyl carboxylate group.

3. A process for producing poly(acetylene) according to claims 1 or 2 wherein the precursor monomer (IV) is a compound in which $R_1$ and $R_2$ are each a trifluoromethyl group, and $R_3$ and $R_4$ are each a hydrogen atom.

4. A process according to claim 1 or 2 wherein the polymerisation of the precursor monomer (IV) is carried out in the presence of a tungsten hexachloride/tetralkyl or aryl tin (1:2 w/w) or titanium tetrachloride/-trialkyl or dihaloalkyl aluminium (1:2 w/w) catalyst at ambient temperatures and pressures.

5. A process according to claim 1 wherein for the precursor polymer (V) which is to be solvent cast into a film is dissolved in an organic solvent to a concentration of up to 100 g/l.

6. A process for producing poly(acetylene) according to claim 5 wherein the organic solvent is selected from acetone, chloroform, ethyl acetate, tetrahydrofuran, toluene and xylene.

7. A process according to claim 1 wherein the solvent casting process is carried out in the substantial absence of moisture and/or oxygen in the system in order to produce a coherent film having the desirable properties of conductance.

8. A process according to claim 1 wherein the precursor polymer film is transformed into poly(acetylene) under a tension or stress in the region of 5 to 1000 MPa.

9. A process according to claim 1 wherein the film of the precursor polymer (V) is heated at a temperature between 20° and 200° C. for between 1 and 100 hours to produce the poly(acetylene) film.

10. A process according to claim 1 wherein the film of the precursor polymer (V) is transformed into poly(acetylene) under conditions of temperature and duration specified in Table 1 of the specification for the respective substituents.

11. A process according to claim 1 wherein the precursor polymer film is transformed into poly(acetylene) under a tension or stress in the region of 20 to 400 MPa.

* * * * *